(12) United States Patent
Seagren et al.

(10) Patent No.: US 7,139,805 B2
(45) Date of Patent: Nov. 21, 2006

(54) SCALABLE JAVA SERVERS FOR NETWORK SERVER APPLICATIONS

(75) Inventors: Charles F. Seagren, Palo Alto, CA (US); Barbara A. Chapman, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 787 days.

(21) Appl. No.: 09/870,029

(22) Filed: May 30, 2001

(65) Prior Publication Data

US 2002/0007410 A1    Jan. 17, 2002

Related U.S. Application Data

(60) Provisional application No. 60/208,021, filed on May 30, 2000.

(51) Int. Cl.
  G06F 15/16   (2006.01)
  G06F 11/00   (2006.01)
  G06F 15/167  (2006.01)

(52) U.S. Cl. .................... 709/207; 709/225; 709/227; 714/4

(58) Field of Classification Search ............... 709/227, 709/238–241, 228, 225, 202, 204, 217; 714/4
See application file for complete search history.

(56) References Cited

U.S. PATENT DOCUMENTS

| | | | |
|---|---|---|---|
| 5,459,837 A | | 10/1995 | Caccavale .............. 395/184.01 |
| 5,774,668 A | * | 6/1998 | Choquier et al. ........... 709/223 |
| 5,892,909 A | * | 4/1999 | Grasso et al. .............. 709/201 |
| 6,128,657 A | | 10/2000 | Okanoya et al. ........... 709/224 |
| 6,236,999 B1 | * | 5/2001 | Jacobs et al. .............. 709/242 |
| 6,247,056 B1 | * | 6/2001 | Chou et al. ................ 709/229 |
| 6,560,717 B1 | * | 5/2003 | Scott et al. .................... 714/4 |
| 6,691,165 B1 | * | 2/2004 | Bruck et al. ................ 709/227 |
| 6,697,849 B1 | * | 2/2004 | Carlson ...................... 709/219 |
| 6,859,834 B1 | * | 2/2005 | Arora et al. ................ 709/227 |

FOREIGN PATENT DOCUMENTS

| | | |
|---|---|---|
| EP | WO 99/53415 | 10/1999 |
| EP | WO 00/28424 | 5/2000 |
| EP | WO 01/33328 A2 | 5/2001 |
| JP | 9218842 A | 8/1997 |

OTHER PUBLICATIONS

"Adaptive QoS Support for Distributed, Java-based Applications", Chatterjee et al. Object-Oriented Real-Time Distributed Computing, 1999. (ISORC '99)Proceedings. 2nd IEEE International Symposium.*

(Continued)

Primary Examiner—Jeffrey Pwu

(57) ABSTRACT

A system for providing Java-implemented Application Servers to a plurality of clients. Each of the Java-implemented Application Servers is configured to execute on a processing element of a server which has multiple independent processing elements arranged such that a failure of one processing element does not affect the operability of the other processing elements. A Distributor is provided to enable making connections with the clients and then determine which of the Application Servers actually services the clients requests. The Distributor attempts to choose the Application Server that has the fewest number of clients as the server for a new client request. A monitoring program restarts the Distributor if it fails. The system thus provides a scalable and available set of Java-implemented Application Servers without requiring any change to the Java-implemented application itself.

16 Claims, 12 Drawing Sheets

OTHER PUBLICATIONS

Guo, Y., et al., "Developing a Distributed Scalable Enterprise JavaBean Server," 8th *International Conference, High Performance Computing and Networking*, (May 2000), vol. 1823, pp. 207-216, ISSN 0302-9743.

Codella, C.F., et al. "Support for Enterprise JavaBeans in Component Broker," *IBM Systems Journal*, (1998), vol. 37. No. 4, pp. 502-538.

International Search Report dated Jan. 7, 2002, PCT/US01/17347.

\* cited by examiner

SCALABLE JAVA SERVERS FOR NETWORK SERVER APPLICATIONS

CROSS-REFERENCE TO RELATED APPLICATIONS

This application is related to and claims the benefit of the filing date of a U.S. provisional application entitled "SCALABLE IP FOR NONSTOP SERVER FOR JAVA", filed on May 30, 2000, and having Ser. No. 60/208,021, which application is hereby incorporated by reference into the instant application.

FIELD OF THE INVENTION

The present invention generally relates to providing a reliable operating environment for an application program and more specifically to providing a scalable and available operating environment for network applications written in the Java programming language.

DESCRIPTION OF THE RELATED ART

The Java programming environment is an attractive environment for developing and running programs. The environment includes a programming language, a set of application programming interfaces and a virtual machine. The programming language is an object-oriented language that is architecturally neutral and portable and has multi-threaded support. The API provides support for I/O, networking and graphics. The Java Virtual Machine (JVM) includes a class loader and interpreter or just in time compiler and executes the compiled class files from a user program and the APIs. The JVM is usually implemented on top of a particular operating system and is system specific. Java programs have rapidly become the standard for implementing a wide range of enterprise-level, server-side business applications.

However, despite the favorable features listed above, the Java technology suffers from several disadvantages chief among which are a lack of scalability and availability. Lack of scalability means that the Java environment does not provide a computing solution if there are more client threads than the Java Virtual Machine and the Application program can handle. In this case, the client threads receive poor service. Lack of availability means that the Java environment does not provide a way to continue the processing of the Java Application if the Application or the JVM encounters a fatal error. In this case, manual intervention is required to reestablish the Java environment and restart the failed application, resulting in a severe interruption to the service provided by the Java program. Given the critical nature of the Java e-commerce applications, the lack of scalability and availability in the Java environment is simply unacceptable. Thus, there is a need for a modified Java environment which supplies scalability and availability without sacrificing portability and architectural-neutral features of Java technology. The present invention is directed towards such a need.

BRIEF SUMMARY OF THE INVENTION

Briefly, the present invention configures a system to provide a distributor module and one or more Java Network Server Applications such that the Network Sever Applications inherit the scalability and availability properties of the system. One system, in accordance with the present invention, is a system for providing Java-implemented Application Servers to a plurality of clients. The system includes a computing system having a plurality of processing elements, each element configured such that, despite a failure of one processing element, the remaining processing elements continue to function, a plurality of Java-implemented Application Servers, where at least one Server assigned to execute on one or more processing elements, and a distributor module that is configured: (i) to capture connection requests from a client on a port, (ii) to select one of the plurality of Application Servers to communicate with the requesting client during the connection and (iii) to assign the connection request to the selected one of the plurality of Application Servers, such that, after the assignment, the selected Application Server communicates directly with the client.

A method in accordance with the present invention includes a method for providing Java-implemented Application Servers to a plurality of clients. The method includes providing a plurality of processing elements, where each element is configured such that, despite a failure of one processing element, the remaining processing elements continue to function. The method further includes causing a plurality of Java-implemented Application Servers to execute on the processing elements, where at least one Server assigned to execute on one or more of the processing elements, receiving incoming client connection requests at at least one port managed by a distributor module, selecting one of the Application Servers to communicate with the client during the connection, and assigning, by the distributor module, the connection request to the selected Application Server such that, after the assignment, the selected Application Server communicates with the client directly.

One advantage of the present invention is that Java-implemented Application Servers need not be rewritten or modified to obtain scalability and availability properties. This maintains the portability of the Java Program.

Another advantage is that a Java-implemented Application Server can be used in applications that demand high levels of scalability. Simply by adding more CPUs to the server, the number of Application Servers can be increased.

Yet another advantage is that the client load on the Java-implemented Application Server can be controlled. A separate Application Server on the same CPU or a different CPU can be added to relieve an Application Server of a client load that is too high. This improves the response times of clients that are connected to the Application Server.

Yet another advantage is that Java-implemented Application Servers can be used in environments that demand little or no down time. An Application Server that fails is restarted on its original CPU or another CPU to maintain a given number of Application Servers present to service client requests.

BRIEF DESCRIPTION OF THE DRAWINGS

These and other features, aspects and advantages of the present invention will become better understood with regard to the following description, appended claims, and accompanying drawings where:

FIG. 1 shows the Java run-time environment;

FIG. 2 shows a system setting for the present invention;

FIG. 3 shows a server system for use in the present invention;

FIG. 4 shows the major components of the present invention;

FIG. 5 shows a flow chart for the set up of the distributor module of the present invention;

FIG. 6 shows a flow chart for the initialization of the distributor module;

DETAILED DESCRIPTION OF THE INVENTION

Figure 1:
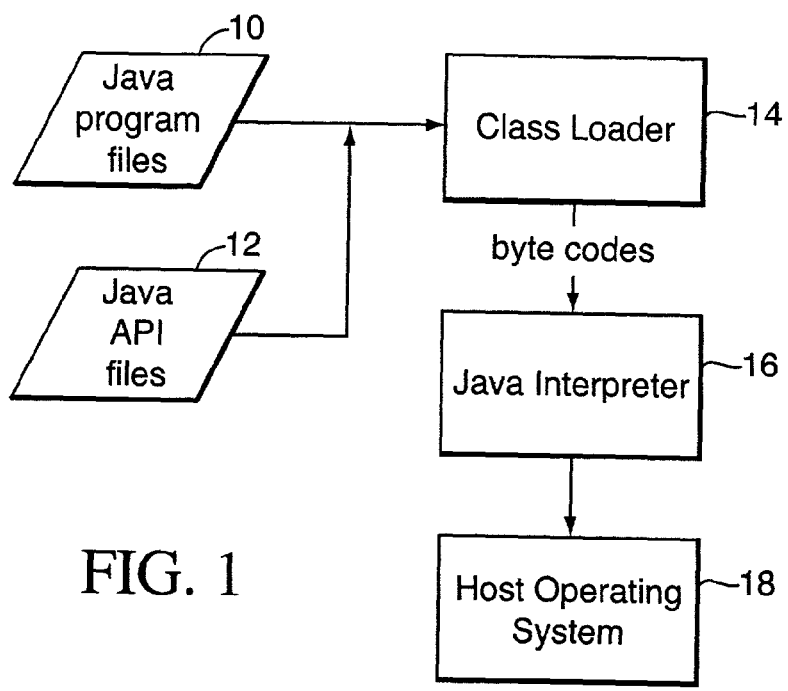

FIG. 1 shows the Java run-time environment. In this environment, Java program class files 10 and Java API class files 12 are loaded by a class loader 14 which supplies the byte codes of the class files to the Java interpreter 16, which is supported by a host operating system 18. As described above, this environment offers a variety of advantages but lacks scalability and availability properties.

Figure 2:
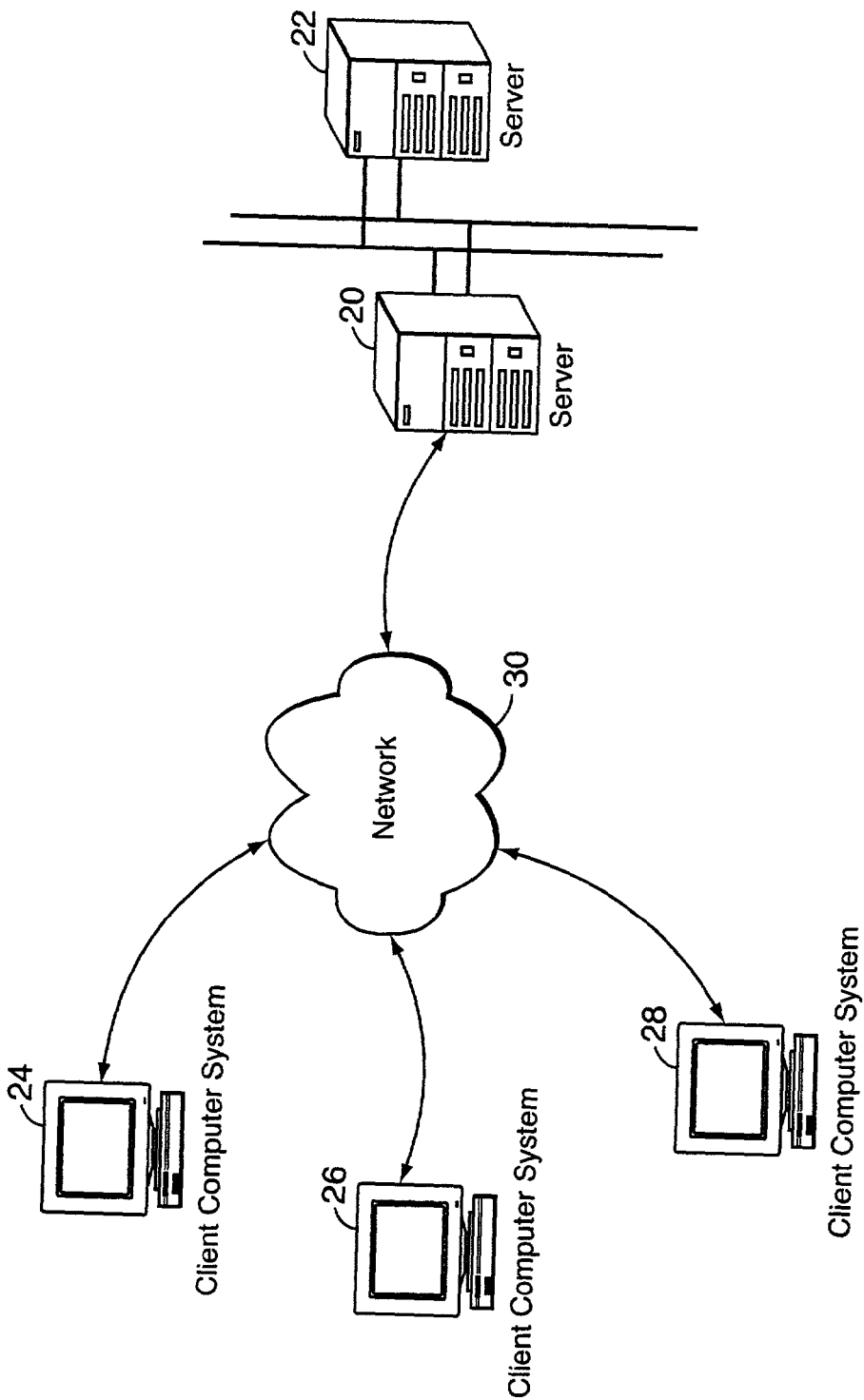

FIG. 2 shows a system setting for the present invention. It is very common for Java applications to be run on one or more server systems 20, 22 to service the requests of clients 24, 26, 28 that are made over a network 30, which can be a local area network, a wide-area network or a network of networks such as the Internet. Such networks typically employ standardized transport service protocols for communicating between the clients and the server. One such transport service conforms to the TCP/IP protocol.

In addition to the protocol, the operating system on the server typically employs a standard set of transport service primitives to access the transport service. A standard set of primitives for a server includes primitives such as a SOCKET call, in which a server first establishes a communication endpoint, a BIND call in which a server assigns an address to the socket, a LISTEN call, by which the server sets up storage for incoming client connection requests, an ACCEPT call to await an incoming connection, SEND and RECEIVE primitives to transmit and receive data over the connection and a CLOSE primitive to end the connection. A client also makes use of these primitives, with the exception of the ACCEPT, BIND and LISTEN calls.

Figure 3:
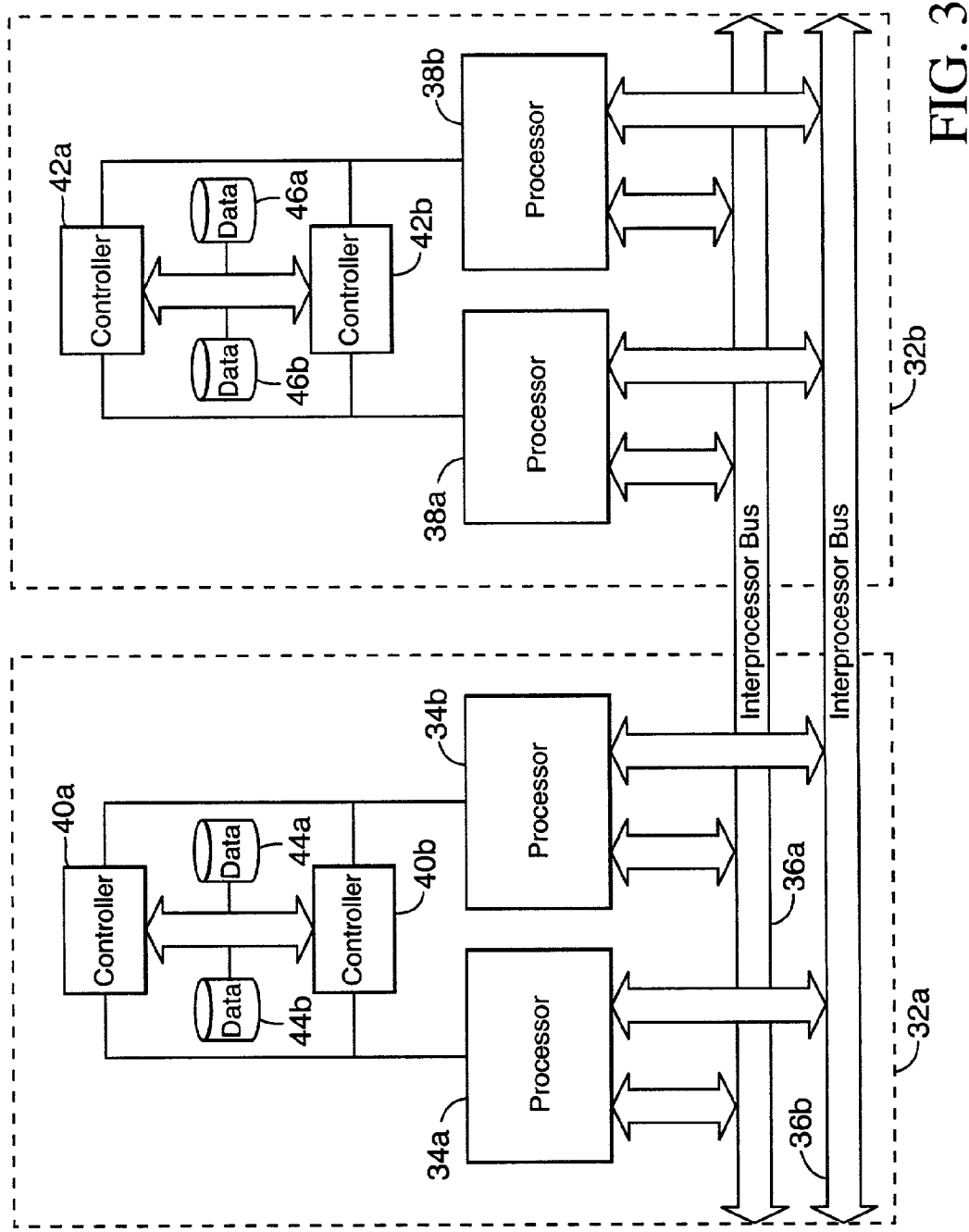

FIG. 3 shows a server system 32a, 32b for use in the present invention. Such a server system 32a, 32b has multiple, similar processing elements 34a, 34b that are interconnected via an interprocessor bus 36a, 36b. Each processing element 34a is preferably independent of the others 34b, 38a, 38b in that it shares little or nothing with the other processors such that a failure of one processing element 38a does not cause a failure of the other processing elements. In one type of server system, this means that each processing element has its own memory, operating system and support systems (not shown). Each server system also has a pair of disk controllers 40a, 40b, 42a, 42b, that respectively connect the processing elements 34a, 34b, 38a, 38b to respective data volumes 44a, 44b, 46a, 46b as shown.

Figure 4:
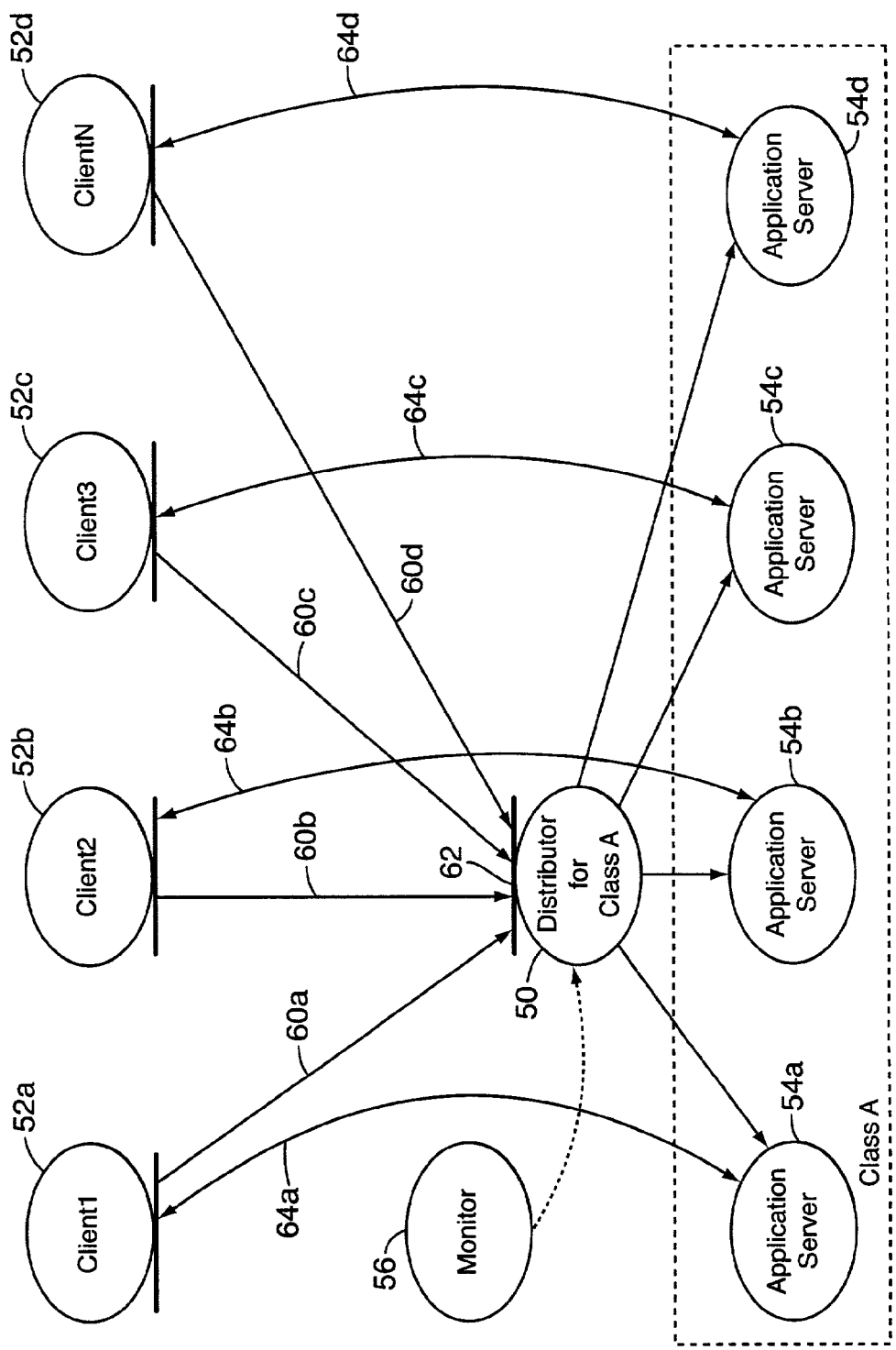

FIG. 4 shows the major software components of the present invention. These components include an Application class-specific Distributor 50 that connects to one or more clients 52a, 52b, 52c 52d, and one or more Java-implemented Application Servers 54a–d. A Monitor program 56 is available for restarting the Distributor 50 if the Distributor 50 fails for some reason. In a multiple processing element server system, the Distributor is configured to run on any of the processing elements 34a–b, 38a–b in FIG. 3, and the Application Servers are configured to run on one or more available processing elements 34a–b, 38a–b in FIG. 3.

The Distributor module 50, in accordance with the present invention, acts as a router that receives client connection requests 60a–d for the Java-implemented Network Application. The Distributor 50 listens on the ports 62 that the Network Application would listen on if there were no Distributor 50, thus acting as a proxy for the Network Application. The Distributor performs load balancing by routing, when possible, client connection requests to the Network Application Server that is least busy.

The Java-implemented Network Application Server modules 54a–d, in accordance with the present invention, and, with them, Java Virtual Machines, are configured to receive client connection requests 60a–d and to complete the connections to one of the clients 52a–d. Once the connection 64a–d is established, one of the Network Application Servers 54a–d performs services requested by the client until the client disconnects from the Network Application Server to which it was connected. A modified Java Virtual Machine is configured to assist in the establishing of the connection.

A set of configuration tools, in accordance with the present invention, is provided to allow the system manager to configure, reconfigure and manage the Java-implemented Network Application Server.

The Distributor Module

Figure 5:
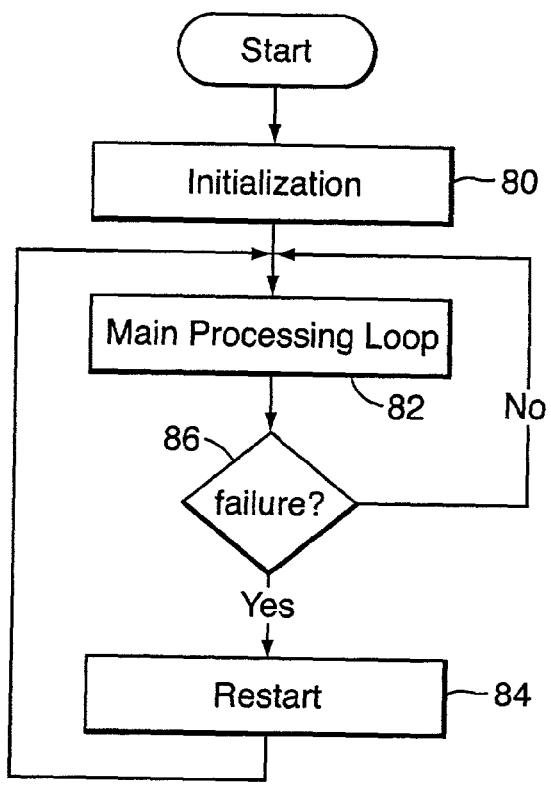

As mentioned above, the Distributor module 50 acts as a router for the Network Application Server Modules. More particularly, the Distributor module is an instance of a server class process. The Distributor executes a BIND call to assign ports to a socket of the Distributor. The ports that are assigned are the ports that the Network Application Server Modules would otherwise listen on. The Distributor module then executes a LISTEN call to set up a data buffer for client connection requests and then an ACCEPT to accept the incoming requests. Once a connection request is received, the Distributor uses a modified round-robin mechanism to find the least busy Network Application Server Module. If a suitable Network Application Server module is found, the Distributor forwards the client connection request to the found server, after which the client and the found server continue their conversation without the Distributor involved, until the connection is closed. FIG. 5 shows a flow chart for the set up of the Distributor module of the present invention. The Distributor has an Initialization phase 80, a main operating phase 82 and a restart phase 84 (if and when a failure 86 occurs), each of which is described in more detail below.

Initialization of the Distributor

Figure 6:
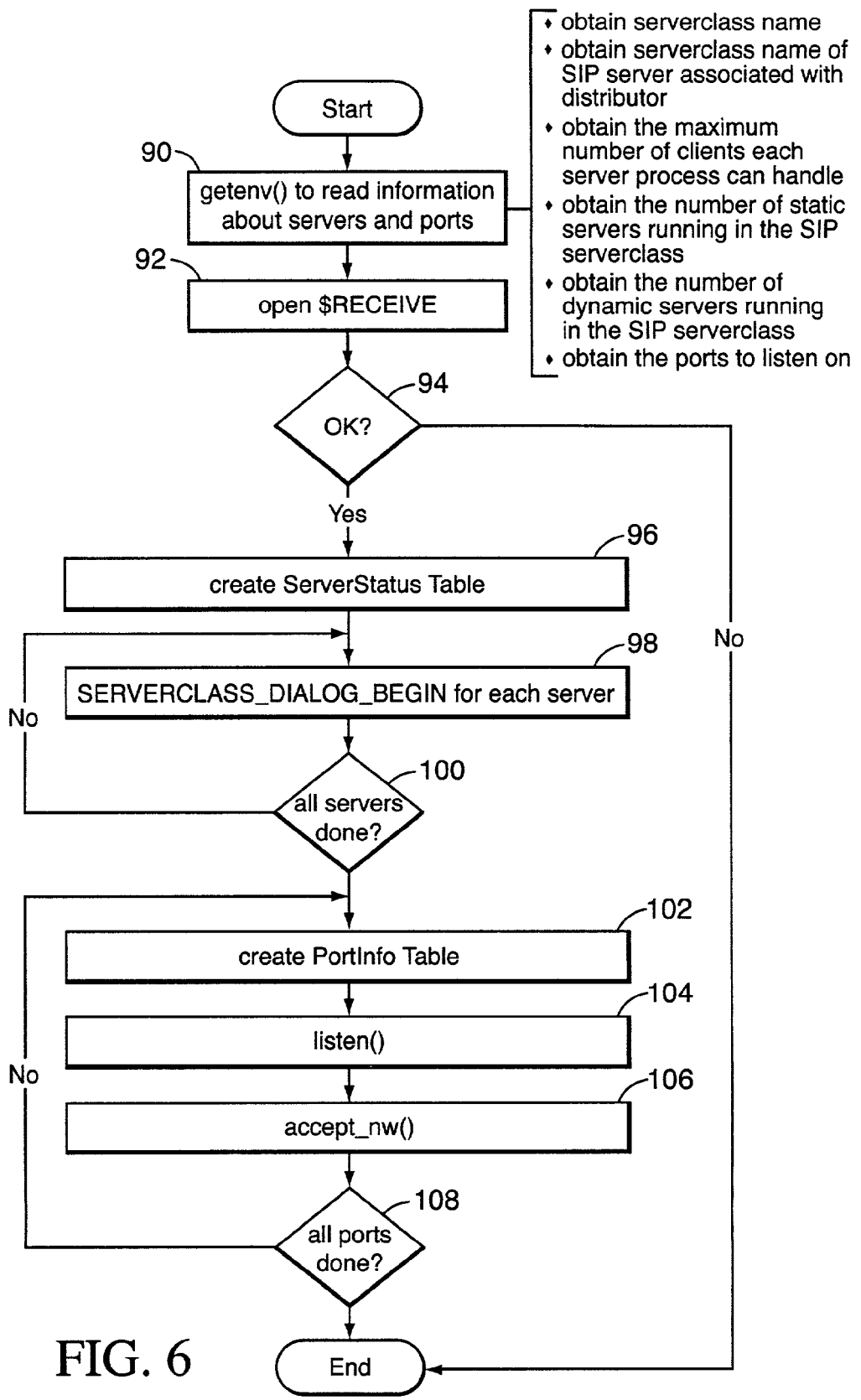

To get started, the Distributor 50 obtains or collects information about the Network Application Servers 54a–d in FIG. 4 associated with the Distributor 50, the maximum number of clients for each Network Application Server and the ports to listen on. FIG. 6 shows a flow chart for the initialization of the Distributor module.

Step 90 sets forth the information obtained by the Distributor at Initialization. The obtained information includes the server class name of the Distributor, the server class name of the Application Servers associated with the Distributor, the maximum number of clients of each Application Server, the number of static Application Servers running in the Application Server class, the number of dynamic Application Servers running in the Application Server class, and the assigned ports on which to listen.

In step 92, the Distributor opens $RECEIVE, (a system wide file which acts as a message queue for many interprocess communication messages) and awaits the client connections. The modified Java Virtual Machine (JVM) assists in the $RECEIVE operation and the second phase of the accept method (i.e., accept_nw2 ( ), a method that creates a new socket for data transfer, and accepts a connection on the new socket), discussed below. If $RECEIVE is successful, in step 94, the Distributor then creates, in step 96, the ServerStatus structure (table). The ServerStatus structure is an internal structure that contains an entry for each of the static Application Servers in the server class associated with the Distributor. The Distributor stores the ServerStatus information about each Application Server in a linked list of these structures: {serverId, dialogId, numClients, sendOutstanding, tag, reqBuf}, where serverId holds a unique identifier for an Application Server, dialog_id holds an identifier for the dialog established with an Application Server, numClients is the number of clients the server is currently handling, sendOutstanding is a Boolean indicating whether a SERVERCLASS_DIALOG_SEND is outstanding for the Application Server, tag indicates the port associated with an outstanding dialog, if any, and reqBuf is a pointer to a request buffer allocated for the Application Server.

Next, in step 98, the SERVERCLASS_DIALOG_BEGIN, a procedure call to initiate a dialog with a server, is invoked for each server. After this function is invoked for all servers as determined by step 100, the PortInfo structure (table) is created for a port, in step 102. The PortInfo structure is an internal structure that contains information associated with the ports on which the Distributor is listening. The Distributor creates a linked list of such structures: {portNumber, fileNum, listenFromSocketAddr, acceptFromSocketAddr}, where portNumber is the port number, fileNum is the file number of the socket that is bound to the port, and listenFromSocketAddr is a pointer to storage that contains the remote address and port number for the connection when the first phase of the accept (accept_nw ( )) completes, and acceptFromSocketAddr contains the remote address and port number of a new connection.

Next, in step 104, the listen( ) function is invoked for the port, and then, in step 106, the accept_nw( ) (the first part of a two-phase accept process) for each port, which places the module in a state in which it is ready to receive client connections. This continues until all ports, in step 108, are ready to receive client connections.

Distributor Operation

Figure 7:
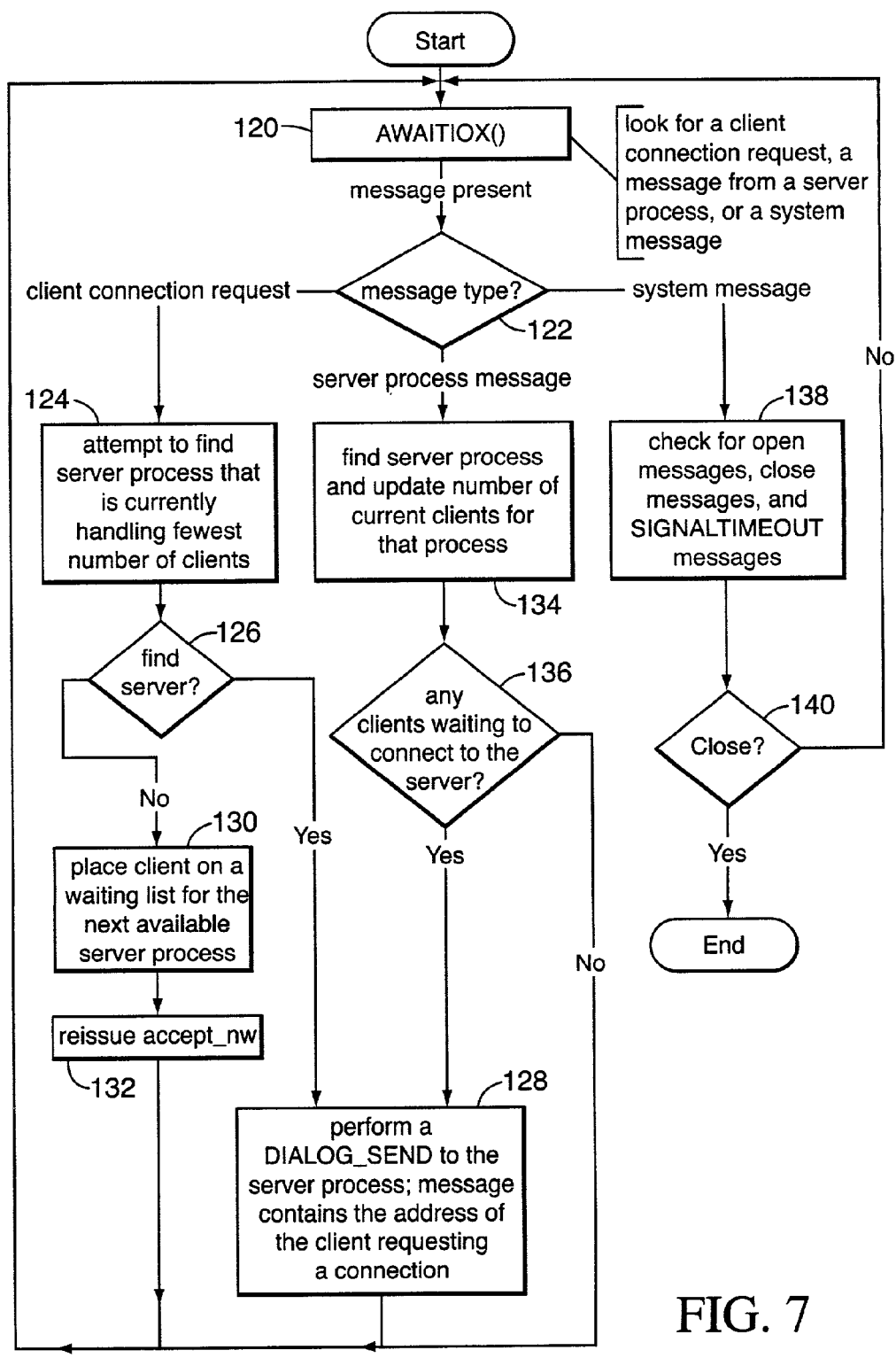
FIG. 7 shows a flow chart for the main processing loop of the distributor module.

FIG. 7 shows a flow chart for the main processing loop of the distributor module. In step 120, the AWAITIOX function is invoked to look for a message. The message can be one of three different message types, a client connection request, a message from a Application Server or a system message.

If a client_connection_request is received, the Distributor, in step 122, attempts, in step 124, to find the server process that is currently handling the fewest number of clients. In step 126, if a qualifying server is found, the Distributor performs a SERVERCLASS_DIALOG_SEND function 128, which initiates a data transfer to an Application Server with an established dialog, to send a message containing the address of the client requesting a connection to the found Application Server. If a qualifying server is not found, as determined in step 126, the client connection request is placed on a waiting list, in step 130, for the next available Application Server that meets the qualification and in step 132, the Distributor reissues an accept_nw( ), a method that listens for connects on an existing socket, to accept the next message.

If a server process message is received, in step 122, the Distributor, in step 134, finds the Application Server and updates the number of current clients for that Application Server, because the message is a disconnect message from the Application Server. If there are any clients waiting to connect to the Application Server that just disconnected from a client, as determined in step 136, then a SERVERCLASS_DIALOG_SEND function, in step 128, is performed to send to the Application Server the address of the client waiting for a connection to that Application Server.

If a system message is received, in step 122, the Distributor, in step 138, checks to determine whether the message is either an open, close or SIGNALTIMEOUT message. The SIGNALTIMEOUT procedure sets a timer to a given number of units of elapsed time, as measured by the processor clock. When the timer expires, the calling process receives an indication in the form of a system message on $RECEIVE.

If the received message is a close message as determined in step 140, the operation phase of the Distributor is ended. Otherwise, the Distributor takes the appropriate steps based on the message and returns to the AWAITIOX call, in step 120, which completes a previously initiated I/O operation, to look for another message.

Figure 8:
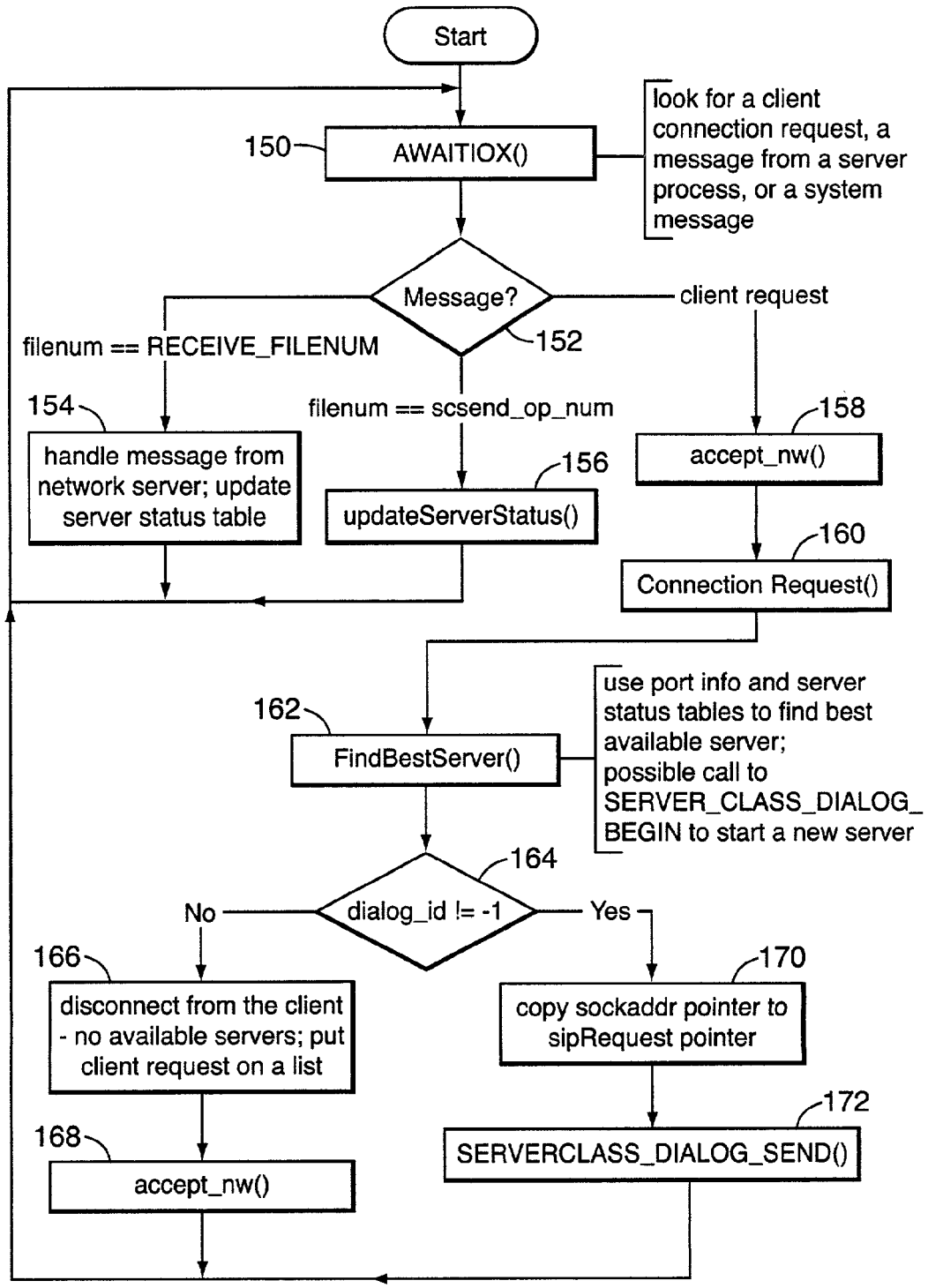
FIG. 8 shows a flow chart that sets out the main processing loop of the distributor module in more detail.

FIG. 8 shows a flow chart that sets out the main processing loop of the distributor module in more detail in accordance with one embodiment. The main processing loop relies on the above-mentioned ServerStatus structure and the PortInfo structure, both of which are created during the Distributor initialization phase.

Referring to FIG. 8, the Distributor executes a AWAITIOX call in step 150 and waits for a new message to arrive in step 152. By testing the fileNum parameter that is returned, the Distributor can determine the message type. If the fileNum parameter matches RECEIVE_FILENUM, then a message from the Application Server is received in step 154. Responding to the message may require that the ServerStatus structure be updated because a disconnect has occurred. If the fileNum parameter matches the scsend_op_num in step 152, then the ServerStatus structure is updated, in step 156, by calling the updateServerStatus function.

If fileNum does not match either RECEIVE_FILENUM or scsend_op_num, in step 152, then the message is determined to be a client connection request (this is the default case). Upon making this determination, a ConnectionRequest ( ) function 160 is called to verify that the port at which the accept_nw ( ) function was just completed 158 is valid. The distributor then calls findBestServer ( ) 162 to find a server to accept the new connection. This routine uses the ServerStatus linked lists to find the best available server. The best server available is the one that will be handling the fewest number of clients after the client connection is assigned. The best server available also will not have an outstanding dialog because this would mean that the server had received a previous client connection request but had not yet responded to the distributor that it had accepted the request. If no such server is available, the Distributor performs a SERVER_CLASS_DIALOG_BEGIN in step 162, a procedure call to initiate a dialog with a server, to force the PATHMON module to start an new Application Server (assuming that not all dynamic servers are running). If the SERVER_CLASS_DIALOG_BEGIN fails, in step 164, then findBestServer ( ) returns a dialog_id value of (−1). Because there are no available servers, the client request is next put on a waiting list, in step 166, accept_nw ( ) is invoked, in step 168, and the Distributor returns to wait for another message in step 150.

If findBestServer ( ) succeeds, in step 164, then findBest-Server ( ) returns with a dialog_id value for the server and a buffer pointer to the request buffer allocated from memory, in step 170, for the Application Server. Next, the Distributor performs a SERVERCLASS_DIALOG_SEND, in step 172, to commence communication between the client and the Application Server.

Distributor Restart

Figure 9:
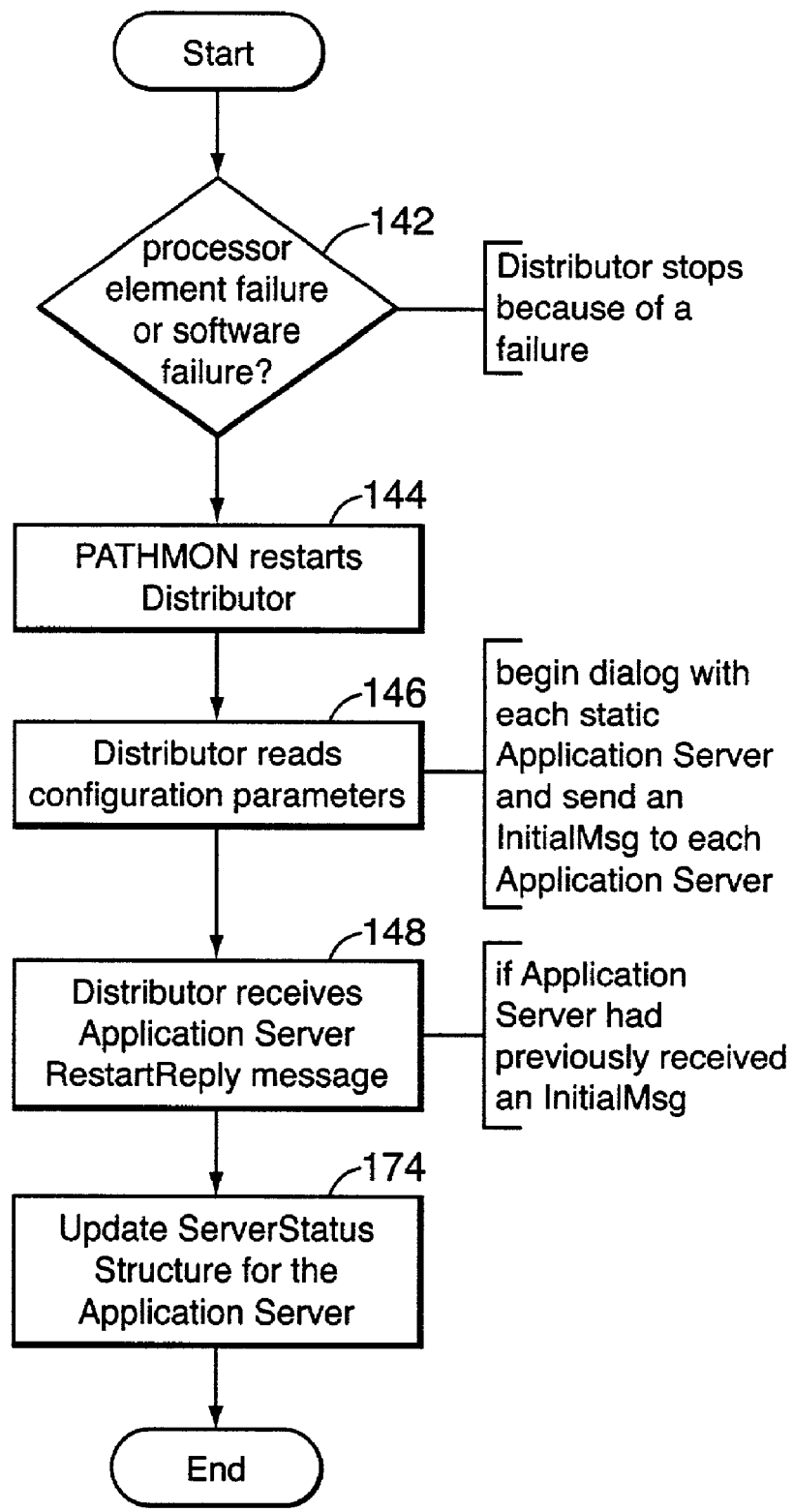
FIG. 9 shows a flow chart for the restarting of the distributor module.

FIG. 9 shows a flow chart for the restarting of the distributor module. If the Distributor terminates because of a processor element failure, the PATHMON module restarts the Distributor, which then performs the steps in the process of reading the configuration parameters. This process includes beginning a dialog with each static Application server and sending an InitialMsg message to each Application server. If the server has already received the message, the server assumes that the Distributor is restarting and reply with a RestartReply message. The Distributor updates the ServerStatus structure for the Application Server and continues processing in the operation phase.

The Application Servers

An Application Server includes any Java-implemented program that uses the java.net.ServerSocket class accept method. This class is normally used to wait for connections from clients. An Application Server using the ServerSocket class, creates a ServerSocket object and calls the class's accept ( ) method to wait for a client connection. When the connection arrives, the accept ( ) method then creates a socket object which the Application Server uses to actually communicate with the client.

In one embodiment of the present invention, a customized ServerSocket class is provided for the Application Server to simplify and include a two-phase accept protocol without altering the API of the object. In the customized Server-Socket class, an interprocess communications routine $RECEIVE is opened, and the code that performs a LISTEN, BIND and ACCEPT is disabled. Instead, when the accept method is invoked, the Application Server employing the customized ServerSocket class waits on $RECEIVE for a message from the Distributor containing the address of the client to accept. Next, the Application Server replies with a message containing the current number of clients being serviced by the Application Server and a new threads routine (accept_nw2 ( )) is called which returns a socket that the Application Server can use to communicate with the client. When the client disconnects from the Application Server, the custom ServerSocket class performs a SERVERCLASS-_SEND to the Distributor with a message than contains the current number of clients. The Distributor responds with an acknowledge which the Application Server receives and discards.

Additionally, an Application Server of the present invention, preferably communicates with a client until the client's request is fully processed. After the communication with the client has terminated, the Application Server closes the socket it used to communicate with the client. The Application Server should not retain a client's state after the client disconnects from the Application Server, because the Distributor cannot guarantee that a particular client will reconnect to the same Application Server.

In accordance with the present invention, a Java-implemented server becomes an Application Server by means of a configuration tool. A program can have several types of Application Servers, with each type performing a different service. Each different Application Server runs in a different server class. As mentioned above, for each server class there is one Distributor in that class.

Figure 10:
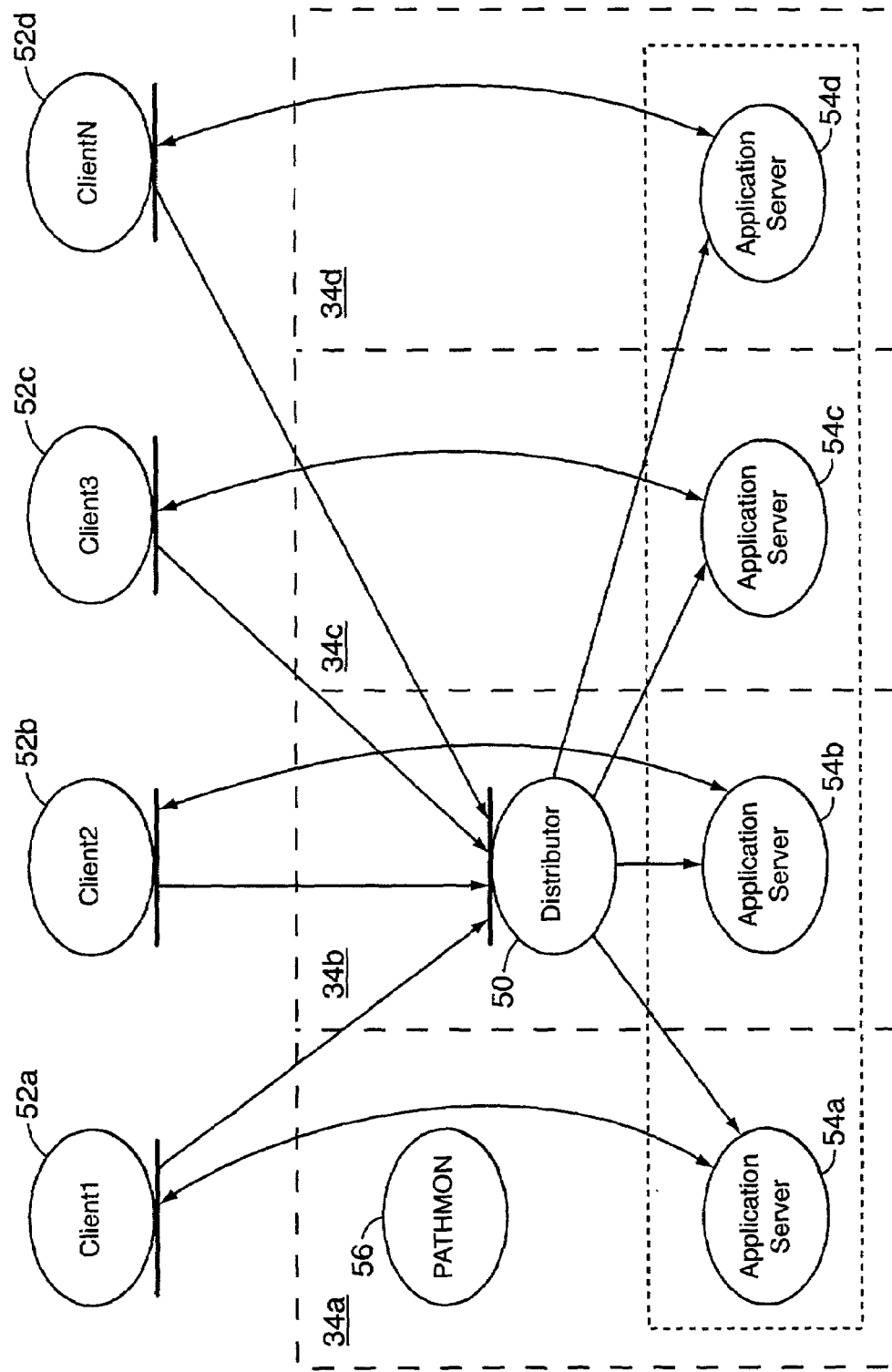
FIG. 10 shows an example of the operation of the present invention in which a single network application runs on each CPU in a single server class.

FIG. 10 shows an example of the operation of the present invention in which a single Application Server 54*a*–*d* runs on each processing element 34*a*–*b*, 38*a*–*b* in a single server class 180. PATHMON 65 is shown running on processing element 34*a* and the Distributor 50 is shown running on processing element 34*b*, though neither module is dedicated to running on any specific processing element. The Distributor 50 creates a socket and binds port 4049 to the socket so that it can accept client connections. A Client 52*a* constructs a socket for itself that specifies port 4049 as the connection endpoint. The Distributor accepts the client request and forwards the request to one 54*a* of the Application Servers (depending on the least busy condition), and thereafter the selected Application Server 54*e* continues the communication with the client until the connection is closed.

Figure 11:
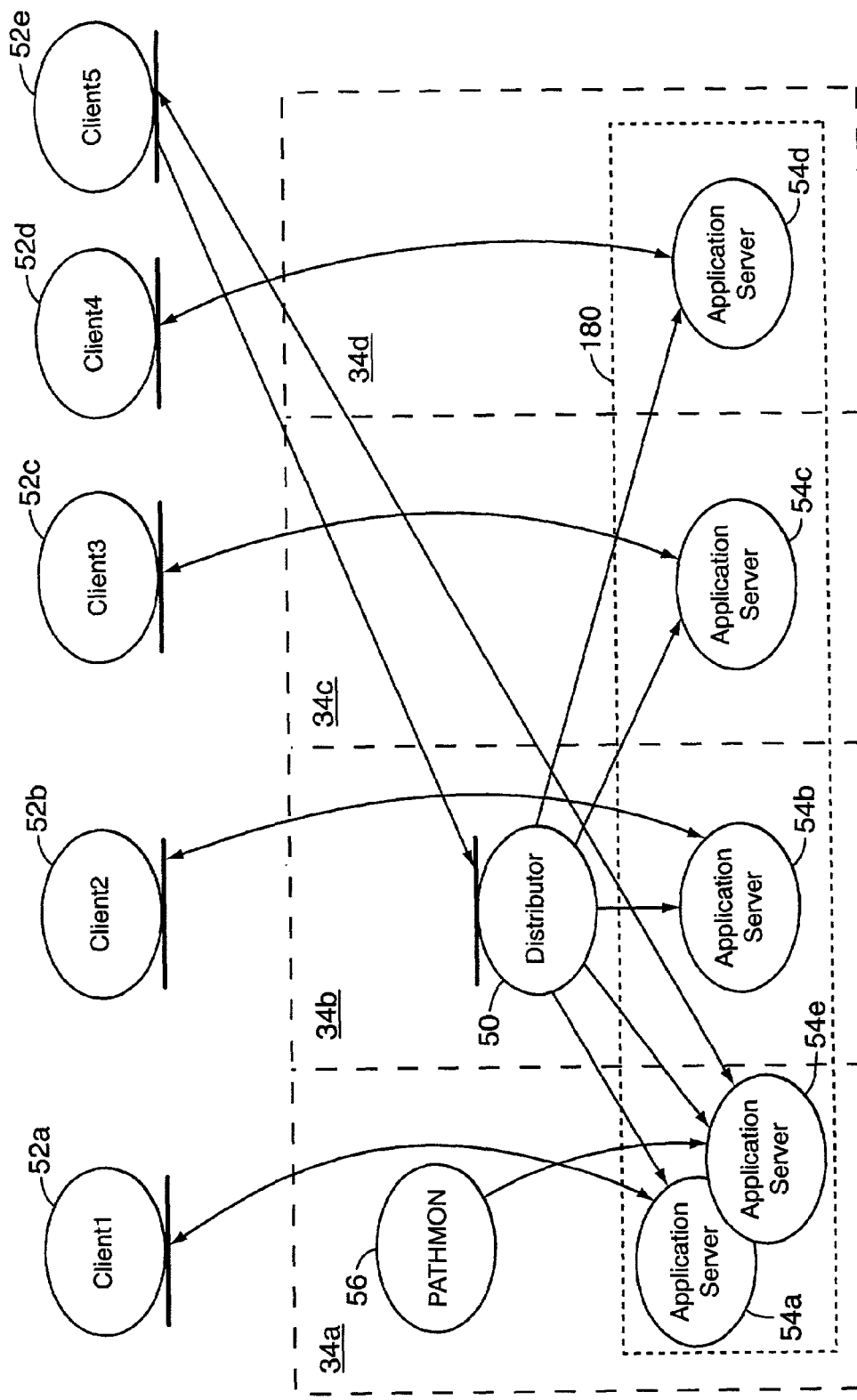
FIG. 11 shows the configuration of FIG. 10, wherein a new client makes a request and a new server is created.

FIG. 11 shows the configuration of FIG. 10, wherein a new client 52*e* makes a connection request and a new server 54*e* is created. In the figure, client 52*e* creates a new socket for itself specifying the host and port number. The Distributor 50 receives the new connection request and attempts to forward the request to an Application Server, but no qualifying server is available. PATHMON 56 is called upon to create a new copy of an Application Server 54*e* and the request is forwarded to the new Application Server 54*e*, after which that Server communicates with client 52*e*.

Figure 12:
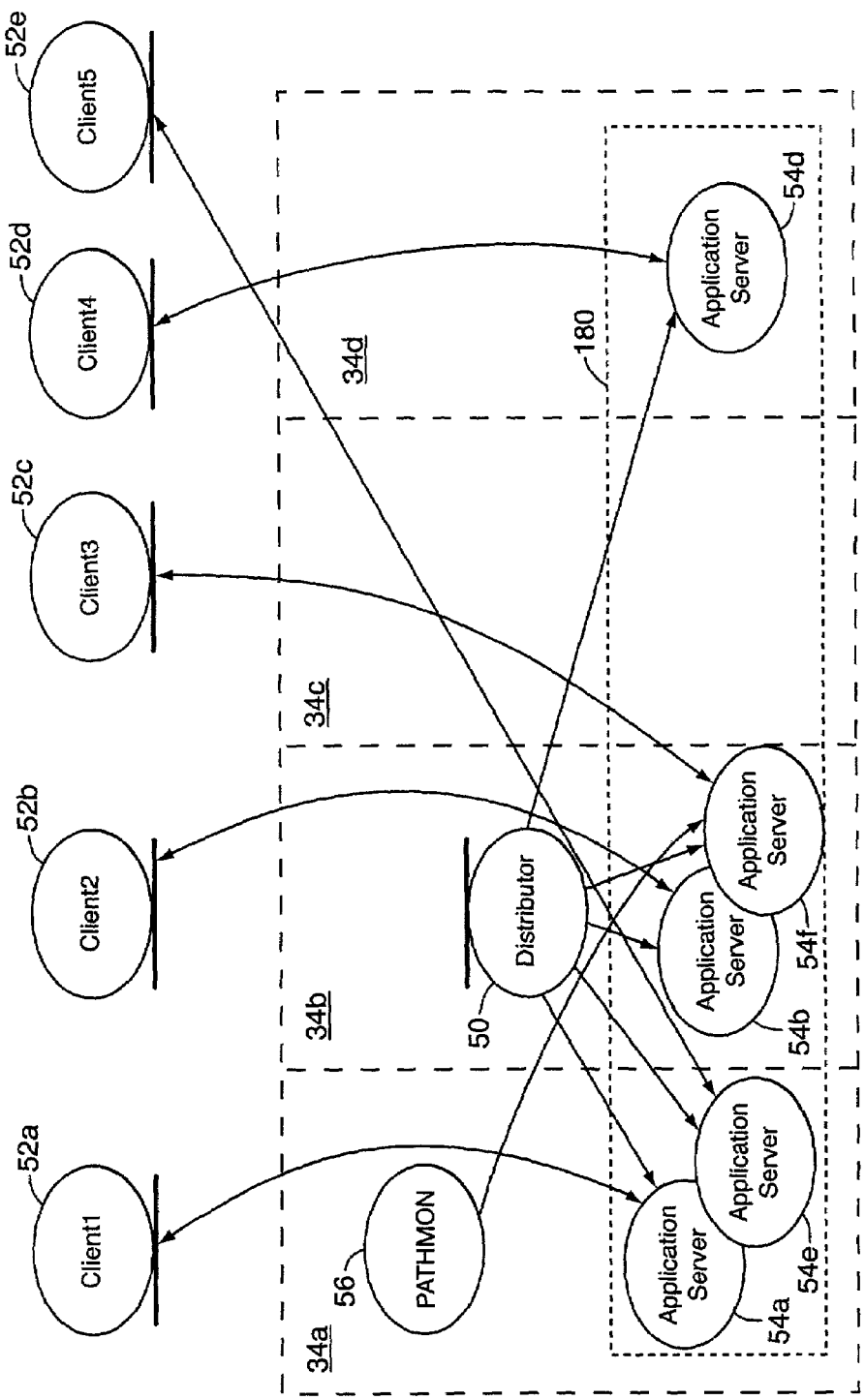
FIG. 12 shows the case of a processor failure.

FIG. 12 shows the case of a processor element failure. In this figure, processing element 34*c* fails. This prompts PATHMON 56 to start a new Application Server 54*f* on an operating processing element, say processing element 34*b*. A client 52*c*, which was connected to the Application Server on the failed processing element, reconnects to the Distributor 50. The Distributor 50 forwards the connection request to the new Application Server 54*f* on processing element 34*b*. The new Application Server 54*f* continues the communication with the client 52*c*.

Figure 13:
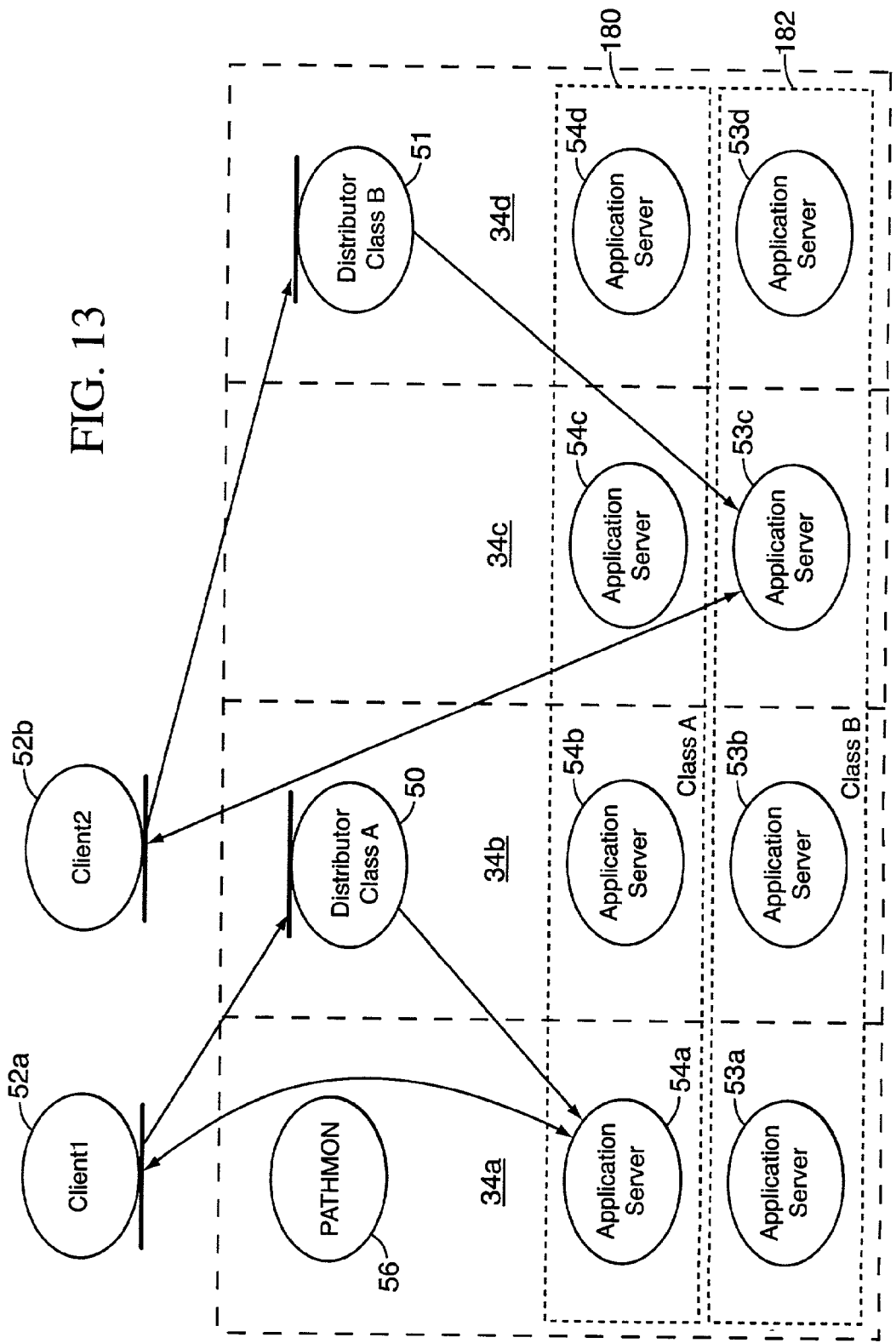
FIG. 13 shows the case of two separate types of Network Applications on each CPU.

FIG. 13 shows the case in which there are two server classes for the Application Servers. One server class 180 is employee_svc and the other 182 is manager_svc. Each type of Application Server listens on a different port. In the figure, client 52*a* connects to an Application Server 54*a* running in the employee_svc server class and Client 52*b* connects to an Application Server 53*c* running in the manager_svc class 182. There are two Distributors 50, 51, one for each class 180, 182. The Distributor 50 for the employee_svc class listens on port 4049 and the Distributor 51 for the manager_svc class listens on port 6157, in one embodiment.

Configuration Utility

The Configuration Utility aids in the capture, from the user, of critical information for configuring and starting the Distributor and the Application Servers. This information includes a name for the PATHMON process;
the primary CPU and backup CPUs for PATHMON;
a log file directory for stderr and stdout files;
the number of Application Server classes;
the location of the Java Virtual Machine to be used;
the number of static Application Servers;
the number of dynamic Application Servers; and
for each type of Application Server the following:
  the name of the TCP/IP process to be associated with a particular Application Server;
  the name of the .class file required for the Application Server;
  port or ports on which to listen for client requests;
  number of connection requests that each Application Server is able to handle concurrently, the processing elements on which the Application Servers should run, the number of Application Servers that should always be running in a particular server class, optionally, the number of Application Servers that can be started if the load on the server system increases, the path to any .class files, .jar or .zip files that are needed by the Application Servers, any interpreter options required by the Application Server such as property name/value pairs, how much memory is allocated on the heap on startup and the maximum heap size required by the Application Server;

After receiving this information the configuration tool creates a configuration file and a start file which is used to start the Application Servers. The configuration file provides the Distributor the information it needs to begin listening and accepting client connection requests. The configuration also provides an Application Server the information it needs to run as a Application Server in a specific server class.

Although the present invention has been described in considerable detail with reference to certain preferred versions thereof, other versions are possible. Therefore, the spirit and scope of the appended claims should not be limited to the description of the preferred versions contained herein.

What is claimed is:

1. A system for providing Java-implemented Application Servers to a plurality of clients, the system comprising:
    a computing system having a plurality of processing elements, each element configured such that, despite a failure of one processing element, the remaining processing elements continue to function;
    a plurality of Java-implemented Application Servers, at least one Server assigned to execute on one or more processing elements; and
    a distributor module that is configured to capture connection requests from a client on a port, to select one of the plurality of Application Servers to communicate with the requesting client during the connection and to assign the connection request to the selected one of the plurality of Application Servers, such that, after the assignment, the selected Application Server communicates directly with the client,
    wherein the distributor module is configured to capture client connection requests only for one of a plurality of Application server classes,
    a monitoring module that is configured to restart the distributor and any Application server that fails.

2. A system for providing Java-implemented Application Servers to a plurality of clients as recited in claim 1, wherein the distributor module is configured to select one of the Application Servers by:
    determining whether there is an Application Server supporting fewer connections than the other Application Servers,
    if there is such an Application Server, sending to the Application Server a message that identifies the client making the connection request,
    if there is no such Application Server, placing the client connection request on a waiting list until such an Application Server is available, and
    when such an Application Server becomes available, sending to the Application Server a message that identifies the client making the connection request.

3. A system for providing Java-implemented Application Servers to a plurality of clients as recited in claim 2, wherein determining whether there is an Application Server supporting fewer connections than the other Application Servers is performed by executing a weighted round robin procedure.

4. A system for providing Java-implemented Application Servers to a plurality of clients as recited in claim 1, wherein the distributor module is further configured to:
    maintain an information structure that includes a number indicating how many clients have a connection with each Application Server,
    receive a message from an Application Server that a connection between the Application Server and a client is closed, and
    update the number of clients with a connection to the Application Server that sent the message.

5. A method for providing Java-implemented Application Servers to a plurality of clients, the method comprising:
    providing a plurality of processing elements, each element configured such that, despite a failure of one processing element, the remaining processing elements continue to function;
    causing a plurality of Java-implemented Application Servers to execute on the processing elements, at least one Server assigned to execute on one or more of the processing elements;
    receiving incoming client connection requests at at least one port managed by a distributor module, the distributor module being configured to receive client connection requests only for one of a plurality of Application server classes;
    selecting one of the Application Servers to communicate with the client during the connection; and
    assigning, by the distributor module, the connection request to the selected Application Server such that, after the assignment, the selected Application Server communicates with the client directly,
    wherein the distributor module maintains an information structure that includes a number indicating how many clients have a connection with each Application Server; and
    further comprising the steps of:
        receiving a message from an Application Server that a connection between the Application Server and a client is closed; and
        updating the number of clients with a connection to the Application Server that sent the message.

6. A method for providing Java-implemented Application Servers to a plurality of clients as recited in claim 5, further comprising the steps of:
    monitoring the operation of the Application Servers and the distributor module for failures;
    if a failure occurs in the distributor module, restarting the distributor module; and
    if a failure occurs in one of the Application servers, restarting the Application server.

7. A method for providing Java-implemented Application Servers to a plurality of clients as recited in claim 5, wherein the step of selection one of the Application Servers includes the steps of:
    determining whether there is an Application Server supporting fewer connections than the other Application Servers;
    if there is such an Application Server, sending to the Application Server a message that identifies the client making the connection request;
    if there is no such Application Server, placing the client connection request on a waiting list until such an Application Server is available; and when such an Application Server becomes available, sending to the Application Server a message that identifies the client making the connection request.

8. A system, comprising:
a plurality of processing elements, each processing element configured such that, despite a failure of one processing element, the remaining processing elements continue to function;
a plurality of application servers assigned to execute on the processing elements, wherein the plurality of application servers comprise distinct classes of application servers; and
a plurality of distributor modules coupled between the application servers and a plurality of clients, wherein each distributor module is configured to handle client connection requests to only a distinct class of application servers,
wherein each distributor module has an initialization phase, a main operating phase and a restart phase.

9. The system of claim 7 wherein the plurality of application servers are implemented using Java.

10. The system of claim 8 wherein, in the initialization phase, a given distributor module obtains a server class name for itself and server class names for application servers associated with the given distributor module.

11. The system of claim 8 wherein, in the main operating phase, a given distributor module sends an address of a requesting client to an application server that is currently handling the fewest number of clients.

12. The system of claim 8 wherein, in the restarting phase, a given distributor module begins a dialog with each application server associated with the given distributor module.

13. The system of claim 8 wherein a distinct class of application servers comprises one of a manager class and an employee class.

14. A method, comprising:
initializing a distributor module, the distributor module being assigned to distribute client connection requests to only one of a plurality of application server types;
receiving incoming client connection requests by the distributor module; and
distributing each client connection request by the distributor module to one of the assigned type of application servers based on a determination of which application server is currently handling the fewest number of clients,
wherein the distributor module is configured to maintain an information structure that includes a number indicating how many clients have a connection with each application server, receive a message from an application server that a connection between the application server and a client is closed, and update the number of clients with a connection to the Application Server that sent the message.

15. The method of claim 14 wherein distributing each client connection request by the distributor module further comprises determining when an application server has not responded to the distributor module regarding a previous request.

16. The method of claim 14 further comprising placing a client connection request on a waiting list until the determination of which application server is currently handling the fewest number of clients is made.

* * * * *

UNITED STATES PATENT AND TRADEMARK OFFICE
CERTIFICATE OF CORRECTION

| | |
|---|---|
| PATENT NO. | : 7,139,805 B2 |
| APPLICATION NO. | : 09/870029 |
| DATED | : November 21, 2006 |
| INVENTOR(S) | : Charles E. Seagren et al. |

It is certified that error appears in the above-identified patent and that said Letters Patent is hereby corrected as shown below:

In column 8, line 14, delete "54e" and insert -- 54a --, therefor.

In column 11, line 20, in Claim 9, delete "claim 7" and insert -- claim 8 --, therefor.

Signed and Sealed this

Twenty-third Day of June, 2009

JOHN DOLL
*Acting Director of the United States Patent and Trademark Office*